US011538039B2

(12) United States Patent
Zhang et al.

(10) Patent No.: US 11,538,039 B2
(45) Date of Patent: Dec. 27, 2022

(54) METHOD AND SYSTEM FOR FACILITATING RISK CONTROL OF AN ONLINE FINANCIAL PLATFORM

(71) Applicant: ADVANCED NEW TECHNOLOGIES CO., LTD., George Town (KY)

(72) Inventors: Lijie Zhang, Hangzhou (CN); Wenbiao Zhao, Hangzhou (CN); Yunfeng Peng, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 41 days.

(21) Appl. No.: 16/938,742

(22) Filed: Jul. 24, 2020

(65) Prior Publication Data

US 2020/0356996 A1 Nov. 12, 2020

Related U.S. Application Data

(63) Continuation of application No. PCT/CN2019/073128, filed on Jan. 25, 2019.

(30) Foreign Application Priority Data

Feb. 12, 2018 (CN) .......................... 201810145339.9

(51) Int. Cl.
  *G06Q 20/40* (2012.01)
  *G06Q 20/02* (2012.01)
  *G06Q 20/08* (2012.01)
(52) U.S. Cl.
  CPC ....... *G06Q 20/4016* (2013.01); *G06Q 20/027* (2013.01); *G06Q 20/0855* (2013.01)

(58) Field of Classification Search
  None
  See application file for complete search history.

(56) References Cited

U.S. PATENT DOCUMENTS 4,281,391 A 7/1981 Huang
6,526,166 B1 2/2003 Gorman
(Continued)

FOREIGN PATENT DOCUMENTS

CN 101383032 3/2009
CN 201498035 6/2010
(Continued)

OTHER PUBLICATIONS

Finzgar, Use of NFC and QR code identification in an electronic ticket system for public transpot, Sep. 15-17, 2011, IEEE, Nov. 1, 2011 (Year: 2011).

(Continued)

*Primary Examiner* — Bruce I Ebersman
*Assistant Examiner* — Matthew Cobb
(74) *Attorney, Agent, or Firm* — Seed IP Law Group LLP

(57) ABSTRACT

One embodiment provides a method and system for managing risk-control commands. During operation, the system can obtain statistics associated with a plurality of risk-control commands issued by a risk-control system corresponding to a plurality of transactions on an online financial platform, and determine, based on the monitored plurality of risk-control commands, whether a subset of risk-control commands meets an anomaly condition. In response to determining that the subset of risk-control commands does not meet the anomaly condition, the system can forward the subset of risk-control commands to the online financial platform to facilitate the online financial platform in performing corresponding transactions according to the subset of risk-control command. In response to determining that the (Continued)

subset of risk-control commands meets the anomaly condition, the system can prevent the subset of risk-control commands from being forwarded to the online financial platform.

16 Claims, 6 Drawing Sheets

(56) References Cited

U.S. PATENT DOCUMENTS

| | | |
|---|---|---|
| 6,601,035 B1 | 7/2003 | Panagos |
| 6,697,947 B1 | 2/2004 | Matyas, Jr. |
| 6,725,448 B1 | 4/2004 | Moriya |
| 6,726,094 B1 | 4/2004 | Rantze |
| 7,103,577 B2 | 9/2006 | Blair |
| 7,130,817 B2 | 10/2006 | Karas |
| 7,149,720 B2 | 12/2006 | Shepherd |
| 7,321,874 B2 | 1/2008 | Dilip |
| 7,447,663 B1 | 11/2008 | Barker |
| 7,617,157 B2 | 11/2009 | Seifert |
| 7,636,679 B2 | 12/2009 | Song |
| 7,734,527 B2 | 6/2010 | Uzo |
| 7,809,636 B1 | 10/2010 | Jou |
| 7,809,762 B1 | 10/2010 | Parker |
| 7,877,297 B2 | 1/2011 | Gould |
| 7,941,760 B2 | 5/2011 | Kocienda |
| 7,946,474 B1 | 5/2011 | Agrawal |
| 7,978,900 B2 | 7/2011 | Nepomniachtchi |
| 8,090,642 B1 | 1/2012 | Van Doren |
| 8,176,324 B1 | 5/2012 | Krishnamurthy |
| 8,280,782 B1 | 10/2012 | Talreja |
| 8,423,392 B2 | 4/2013 | Moxley |
| 8,423,467 B1 | 4/2013 | Johansson |
| 8,498,933 B1 | 7/2013 | Bent |
| 8,600,873 B2 * | 12/2013 | Fisher ............. G06Q 20/24 705/38 |
| 8,645,295 B1 | 2/2014 | Dillard |
| 9,111,073 B1 | 8/2015 | Jiang |
| 9,239,722 B1 | 1/2016 | Calahan |
| 9,317,850 B2 | 4/2016 | Keresman, III |
| 9,621,348 B2 | 4/2017 | Bahjat |
| 9,715,681 B2 | 7/2017 | Hammad |
| 10,176,478 B2 | 1/2019 | Griggs |
| 10,586,227 B2 | 3/2020 | Makhdumi |
| 2002/0111916 A1 | 8/2002 | Coronna |
| 2002/0156687 A1 | 10/2002 | Carr |
| 2002/0161466 A1 | 10/2002 | Heching |
| 2003/0042301 A1 | 3/2003 | Rajasekaran |
| 2003/0061172 A1 | 3/2003 | Robinson |
| 2003/0200190 A1 | 10/2003 | Adar |
| 2004/0139008 A1 | 7/2004 | Mascavage |
| 2004/0153407 A1 | 8/2004 | Clubb |
| 2005/0038707 A1 | 2/2005 | Roever |
| 2005/0071637 A1 | 3/2005 | Shirakawa |
| 2005/0075954 A1 | 4/2005 | Matsumoto |
| 2005/0113123 A1 | 5/2005 | Torvinen |
| 2005/0144406 A1 | 6/2005 | Chong, Jr. |
| 2005/0170856 A1 | 8/2005 | Keyani |
| 2005/0240935 A1 | 10/2005 | Ramanathan |
| 2006/0010190 A1 | 1/2006 | Shimbo |
| 2006/0056626 A1 | 3/2006 | Keohane |
| 2006/0069635 A1 | 3/2006 | Ram |
| 2006/0089897 A1 | 4/2006 | Maas |
| 2006/0176847 A1 | 8/2006 | Chen |
| 2006/0220842 A1 | 10/2006 | Breed |
| 2006/0271783 A1 | 11/2006 | Wong |
| 2007/0035617 A1 | 2/2007 | Ko |
| 2007/0043651 A1 | 2/2007 | Xiao |
| 2007/0276730 A1 | 11/2007 | Lee |
| 2008/0004981 A1 | 1/2008 | Gopalpur |
| 2008/0077542 A1 | 3/2008 | Mcelhiney |
| 2008/0097805 A1 | 4/2008 | Wells |
| 2008/0119160 A1 | 5/2008 | Andriantsiferana |
| 2008/0120160 A1 | 5/2008 | Woo |
| 2008/0182586 A1 | 7/2008 | Aaron |
| 2008/0228595 A1 | 9/2008 | Hill |
| 2008/0235122 A1 | 9/2008 | Weitzman |
| 2008/0301040 A1 * | 12/2008 | Knudson ............. G06Q 20/10 705/39 |
| 2008/0306839 A1 | 12/2008 | Starrs |
| 2009/0076926 A1 | 3/2009 | Zinberg |
| 2009/0090772 A1 | 4/2009 | Lee |
| 2009/0094275 A1 | 4/2009 | Patton |
| 2009/0106825 A1 | 4/2009 | Cerruti |
| 2009/0144451 A1 | 6/2009 | Cabezas |
| 2009/0157522 A1 | 6/2009 | Srinivasan |
| 2009/0195506 A1 | 8/2009 | Geidl |
| 2010/0042600 A1 | 2/2010 | Orr |
| 2010/0060585 A1 | 3/2010 | Chiu |
| 2010/0073302 A1 | 3/2010 | Ritzau |
| 2010/0088026 A1 | 4/2010 | Manolescu |
| 2010/0162036 A1 | 6/2010 | Linden |
| 2010/0191648 A1 | 7/2010 | Smith |
| 2010/0210240 A1 | 8/2010 | Mahaffey |
| 2010/0223543 A1 | 9/2010 | Marston |
| 2010/0235283 A1 | 9/2010 | Gerson |
| 2010/0241575 A1 | 9/2010 | Cotton |
| 2010/0250436 A1 | 9/2010 | Loevenguth |
| 2011/0016520 A1 | 1/2011 | Cohen |
| 2011/0093493 A1 | 4/2011 | Nair |
| 2011/0125616 A1 | 5/2011 | Ni |
| 2011/0125667 A1 | 5/2011 | Faludi |
| 2011/0184840 A1 | 7/2011 | Godard |
| 2011/0231465 A1 | 9/2011 | Phatak |
| 2011/0258027 A1 | 10/2011 | Lee |
| 2011/0264598 A1 | 10/2011 | Fuxman |
| 2012/0016799 A1 | 1/2012 | Killian |
| 2012/0076283 A1 | 3/2012 | Ajmera |
| 2012/0101942 A1 | 4/2012 | Park |
| 2012/0117271 A1 | 5/2012 | Kennedy |
| 2012/0143924 A1 | 6/2012 | Sethi |
| 2012/0158467 A1 | 6/2012 | Hammad |
| 2012/0198228 A1 | 8/2012 | Oberheide |
| 2012/0204256 A1 | 8/2012 | Craine |
| 2012/0233073 A1 | 9/2012 | Salmon |
| 2012/0259774 A1 | 10/2012 | Marti |
| 2012/0259783 A1 | 10/2012 | Kemper |
| 2012/0284776 A1 | 11/2012 | Sundaram |
| 2012/0299831 A1 | 11/2012 | Lioy |
| 2012/0323846 A1 | 12/2012 | Bai |
| 2013/0066889 A1 | 3/2013 | Rodriguez |
| 2013/0067055 A1 | 3/2013 | Cheng |
| 2013/0094751 A1 | 4/2013 | Nepomniachtchi |
| 2013/0110670 A1 | 5/2013 | Webber |
| 2013/0132275 A1 * | 5/2013 | Enzaldo ............. G06Q 40/02 705/44 |
| 2013/0138563 A1 * | 5/2013 | Gilder ............. G06Q 20/4016 705/44 |
| 2013/0232071 A1 | 9/2013 | Dilip |
| 2013/0246172 A1 | 9/2013 | Moissinac |
| 2013/0311532 A1 | 11/2013 | Olsen |
| 2013/0317895 A1 | 11/2013 | Turner |
| 2013/0331130 A1 | 12/2013 | Lee |
| 2014/0037184 A1 | 2/2014 | Gorski |
| 2014/0052636 A1 | 2/2014 | Mattes |
| 2014/0156512 A1 | 6/2014 | Rahman |
| 2014/0162698 A1 | 6/2014 | Han |
| 2014/0164109 A1 | 6/2014 | Chow |
| 2014/0173755 A1 | 6/2014 | Wahl |
| 2014/0236801 A1 | 8/2014 | Hansen |
| 2014/0279525 A1 | 9/2014 | Mohsenzadeh |
| 2014/0280910 A1 | 9/2014 | Swig |
| 2014/0306896 A1 | 10/2014 | Sosby |
| 2014/0310133 A1 | 10/2014 | Bednar |
| 2014/0310171 A1 | 10/2014 | Grossman |
| 2015/0066679 A1 | 3/2015 | Mack |
| 2015/0154587 A1 | 6/2015 | Chetty |
| 2015/0186989 A1 | 7/2015 | Kneen |
| 2015/0220876 A1 | 8/2015 | Sethi |
| 2015/0235477 A1 | 8/2015 | Simkin |
| 2015/0356288 A1 | 12/2015 | Guo |
| 2015/0379460 A1 | 12/2015 | Zamer |
| 2015/0381629 A1 | 12/2015 | O'Sullivan |

(56) References Cited

U.S. PATENT DOCUMENTS

| | | | |
|---|---|---|---|
| 2016/0004857 A1 | 1/2016 | Chen | |
| 2016/0012503 A1 | 1/2016 | Fu | |
| 2016/0077734 A1 | 3/2016 | Buxton | |
| 2016/0104163 A1* | 4/2016 | Aquino | G06Q 20/4016 705/44 |
| 2017/0270598 A1 | 9/2017 | Ram | |

FOREIGN PATENT DOCUMENTS

| | | |
|---|---|---|
| DE | 102004047258 | 4/2006 |
| EP | 0992949 | 4/2000 |
| EP | 1067471 | 1/2001 |
| GB | 2378787 | 2/2003 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2007087081 | 4/2007 |
| JP | 2008532112 | 8/2008 |
| JP | 2009020676 | 1/2009 |
| JP | 2010066886 | 3/2010 |
| JP | 2012168616 | 9/2012 |
| JP | 2013235605 | 11/2013 |
| JP | 201441614 | 6/2014 |
| JP | 2014515149 | 6/2014 |
| KR | 20020057906 | 7/2002 |
| KR | 1020020057906 | 7/2002 |
| KR | 1020070034296 | 3/2007 |
| WO | 2012045128 | 4/2012 |
| WO | 2013003372 | 1/2013 |
| WO | 2013149883 | 10/2013 |
| WO | 2017080768 | 5/2017 |

OTHER PUBLICATIONS

Kanitkar et al. "Real-time processing in client-server databases", 2002, IEEE Transactions on Computers (vol. 51, Issue: 3, Mar. 2002), pp. 1-4 of 2.1 (Year: 2002).

* cited by examiner

METHOD AND SYSTEM FOR FACILITATING RISK CONTROL OF AN ONLINE FINANCIAL PLATFORM

RELATED APPLICATION

Under 35 U.S.C. § 120 and § 365(c), this application is a continuation of PCT Application No. PCT/CN2019/073128, entitled "METHOD, APPARATUS AND DEVICE FOR PROCESSING RISK CONTROL INSTRUCTIONS," by inventors Lijie Zhang, Wenbiao Zhao, and Yunfeng Peng, filed 25 Jan. 2019, which claims priority to Chinese Patent Application No. 201810145339.9, filed on 12 Feb. 2018.

BACKGROUND

Field

The present application relates to a method and system for facilitating risk control of an online financial platform. More specifically, this application relates to a method and system that can monitor and regulate operations of a risk-control system.

Related Art

The rapid development of computing technologies has allowed the Internet technology to be extended into the financial domain. Various types of online financial platform (e.g., third-party payment platforms, peer-to-peer lending platforms, crowdfunding platforms, online-banking platforms, online-brokerage platforms, etc.) are currently being provided to customers. Risk control is important to ensure confidence of customers of online financial platforms.

Many online financial platforms can include or be coupled to a risk-control system. Before the execution of a transaction (e.g., a transfer, a deposit, a withdrawal, etc.), the online financial platform can forward the transaction to the risk-control system, which can identify potential risks associated with the transaction and outputs a risk-control command. For example, if the risk-control system identifies a risk (e.g., a fraud risk or a money-laundering risk) associated with an online-banking transaction, it can output a risk-control command to the online-banking platform, prompting the online-banking platform to stop the transaction and freeze the accounts involved in the transaction. If the risk-control system determines that there is no risk or the risk level is low, it can output a risk-control command to instruct the online-banking platform to execute the transaction as normal.

However, there is a possibility that the risk-control system may malfunction, which can be caused by failures in hardware or software. In addition, a newly implemented risk-control policy may be problematic, causing abnormal operations of the risk-control system, such as misjudging a large number of no-risk transactions as being risky and consequently outputting risk-control commands to freeze a large number of customer accounts. The malfunctioning risk-control system can cause unwanted interruption to services provided by the online-banking platform and significant inconvenience to affected customers.

SUMMARY

One embodiment provides a method and system for managing risk-control commands. During operation, the system can obtain statistics associated with a plurality of risk-control commands issued by a risk-control system corresponding to a plurality of transactions on an online financial platform, and determine, based on the monitored plurality of risk-control commands, whether a subset of risk-control commands meets an anomaly condition. In response to determining that the subset of risk-control commands does not meet the anomaly condition, the system can forward the subset of risk-control commands to the online financial platform to facilitate the online financial platform in performing corresponding transactions according to the subset of risk-control commands. In response to determining that the subset of risk-control commands meets the anomaly condition, the system can prevent the subset of risk-control commands from being forwarded to the online financial platform.

In a variation on this embodiment, the subset of risk-control commands can include one of: risk-control commands of a particular type, risk-control commands of a particular type associated with a particular set of risk-control policies, and risk-control commands of a particular type associated with a particular risk-control policy. The particular type of risk-control command is configured to instruct the online financial platform to perform a particular action associated with a corresponding transaction; the particular set of risk-control policies is associated with a particular type of transaction; and the particular risk-control policy is associated with a particular type of risk.

In a variation on this embodiment, the statistics associated with the plurality of risk-control commands can include one or more of: a number of risk-control commands within the subset issued by the risk-control system over a predetermined time interval, and a ratio between a number of risk-control commands within the subset and a total number of risk-control commands issued by the risk-control system over a predetermined time interval.

In a further variation, the anomaly condition specifies a higher threshold and a lower threshold, and the subset of risk-control commands meets the anomaly condition if the number or the ratio is greater than the higher threshold or less than the lower threshold.

In a further variation, the anomaly condition can be determined based on historical data associated with the subset of risk-control commands.

In a further variation, the anomaly condition can be determined based on probability distribution of the number or the ratio and a predetermined confidence interval.

In a variation on this embodiment, preventing the subset of risk-control commands from being forwarded to the online financial platform can further include substituting the subset of risk-control commands using a second subset of risk-control commands, wherein the subset and second subset of risk-control commands are of different types, and forwarding the second subset of risk-control commands to the online financial platform to facilitate the online financial platform in performing corresponding transactions according to the second subset of risk-control commands.

In a variation on this embodiment, subsequent to preventing the subset of risk-control commands from being forwarded to the online financial platform, the system can continue to monitor the subset of risk-control commands to determine whether the subset of risk-control commands no longer meets the anomaly condition. In response to determining that the subset of risk-control commands no longer meets the anomaly condition, the system can start to forward the subset of risk-control commands to the online financial platform.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a solution to the technical problem of monitoring and regulating, automatically, the operations of a risk-control system coupled to an online financial platform. More specifically, the system monitors the risk-control commands (e.g., the types of command and the number of commands for each type) issued by the risk-control system to detect abnormal operations of the risk-control system. In response to detecting that the risk-control system is issuing a particular type of risk-control command at an abnormal rate, the system can automatically modify the operations of the risk-control system (e.g., by suspending the delivery or lowering the level of penalty of that particular type of risk-control command). This way, the system can prevent the malfunctioning risk-control system from interrupting the online financial platform in the provision of normal services to customers. The system can continue to monitor the issuance of the risk-control commands. Once the risk-control system is no longer issuing that particular type of risk-control command at an abnormal rate, the system can resume the normal delivery of the risk-control commands to the online financial platform.

Risk-Control-Command-Management System

Figure 1:
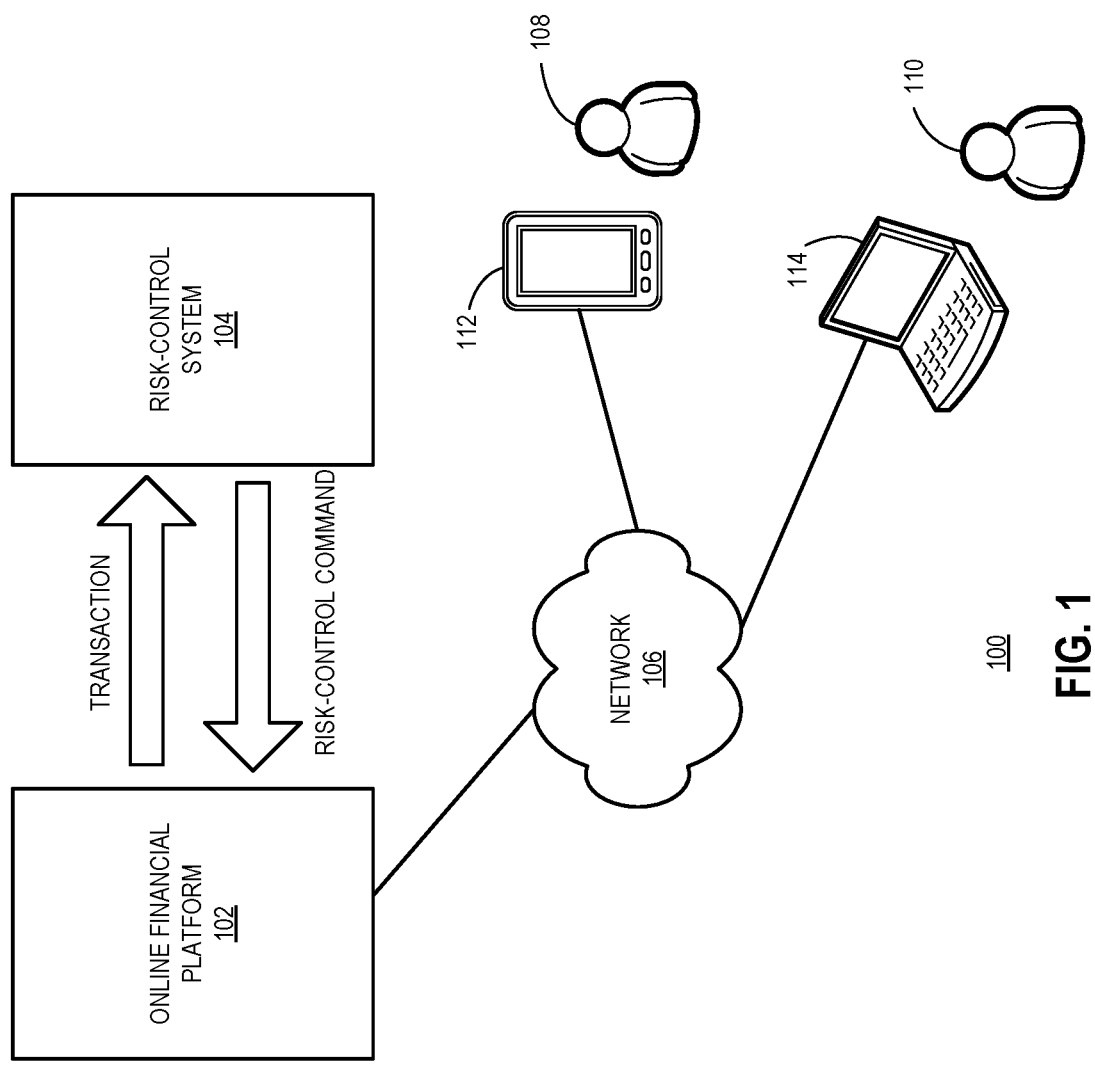
FIG. 1 presents a diagram illustrating an exemplary computing environment, according to one embodiment.

FIG. 1 illustrates an exemplary computing environment, according to one embodiment. Computing environment 100 can include an online financial platform 102 and a risk-control system 104. Online financial platform 102 can provide various internet finance services to its customers, such as third-party payment, peer-to-peer lending, etc. Before completing a transaction (or providing a service), online financial platform 102 forwards the transaction, including background information associated with the transaction, to risk-control system 104, which can then determine a risk level or identify a potential risk associated with the transaction based on a number of risk-control policies. Risk-control system 104 can generate a risk-control command for the transaction according to the determined risk level or identified risk. Upon receiving the risk-control command, online financial platform 102 performs a risk-control action specified by the risk-control command, such as executing the transaction or service as normal, requiring user authentication before executing the transaction, limiting the ability to receive payment, freezing the transaction, freezing the account associated with the transaction, etc.

Depending on the risk level or the type of risk, the risk-control command can specify different risk-control actions, with each risk-control action corresponding to a certain level of penalty. For example, if the determined risk level for a transaction is low, the risk-control command can specify an action to execute the transaction as normal, which corresponds to a lowest penalty level (e.g., level 0). If the determined risk level is high (e.g., suspected money laundering), the risk-control command can specify an action to freeze the accounts associated with the transaction, which corresponds to a relatively high penalty level. If the determined risk level is in between (e.g., suspected identity theft), the risk-control command can specify an action to require additional user identification before executing the transaction, which corresponds to a medium penalty level.

Online financial platform 102 can provide services to a number of users (e.g., users 108 and 110) via a network 106 and a number of computing devices (e.g., computing devices 112 and 114) associated with the users. Moreover, online platform 102 and risk-control system 104 can be implemented on one or more server computers, which can include standalone computers, virtual servers provided by clusters of standalone computers, or cloud servers. Network 106 can include various types of wired or wireless networks. In some embodiments, network 106 can include the public switched telephone network (PSTN) and the Internet.

Computing devices 112 and 114 can include various mobile devices, including but not limited to: smartphones, tablet computers, laptop computers, personal digital assistants (PDAs), various wearable computing devices (e.g., smart glasses and watches), etc. In addition to mobile devices, the solutions provided herein can also be applied to other types of computing devices, such as desktop computers or computer servers.

As discussed previously, a malfunctioning risk-control system can interrupt normal services provided by the online financial platform to its customers. In current systems, human intervention is often needed to correct the malfunctioning risk control system. For example, an administrator can manually take a problematic risk-control policy offline or repair system errors (either hardware or software errors). Such operations can be delayed, resulting in possible interruptions to normal services. After the correction of the risk-control policy or the system errors, manual operations may be needed to restore the normal operation of the risk-control system. Such operations can also be time-consuming. Moreover, the current systems often rely on the experience of human operators to detect a malfunctioning risk-control system, thus being incapable of detecting a risk-control system misbehaving in an unknown manner. Another disadvantage of this manual-control mechanism is its lack of precision. When the human operator determines that the risk-control system is malfunctioning, the operator may take the entire risk-control system offline, even if only one particular risk-control policy is problematic. What is needed is a mechanism that can automatically manage the risk-control commands issued by the risk-control management system on a per-policy basis.

In some embodiments, an automatic command-management system can be provided. The command-management system can be part of the risk-control system or can be a separate system coupled to the risk-control system. For example, the command-management system can be part of the online financial platform or independent of the risk-control system and the online financial platform. The command-management system can monitor the types and numbers of risk-control commands issued by the risk-control system to determine whether the risk-control system is malfunctioning and to identify a problematic risk-control policy. Upon identifying a problematic risk-control policy, the command-management system can take appropriate actions (e.g., activating a circuit-breaker mechanism) against risk-control commands associated with the problematic risk-control policy. For example, the command-management system can intercept those risk-control commands, preventing them from reaching the online financial platform. Alternatively, the command-management system can lower the penalty level specified by the risk-control commands. In one example, the command-management system can lower the penalty level of a risk-control action from the high penalty level of "freezing customers' account" to a low penalty level of "requiring user authentication."

Figure 2:
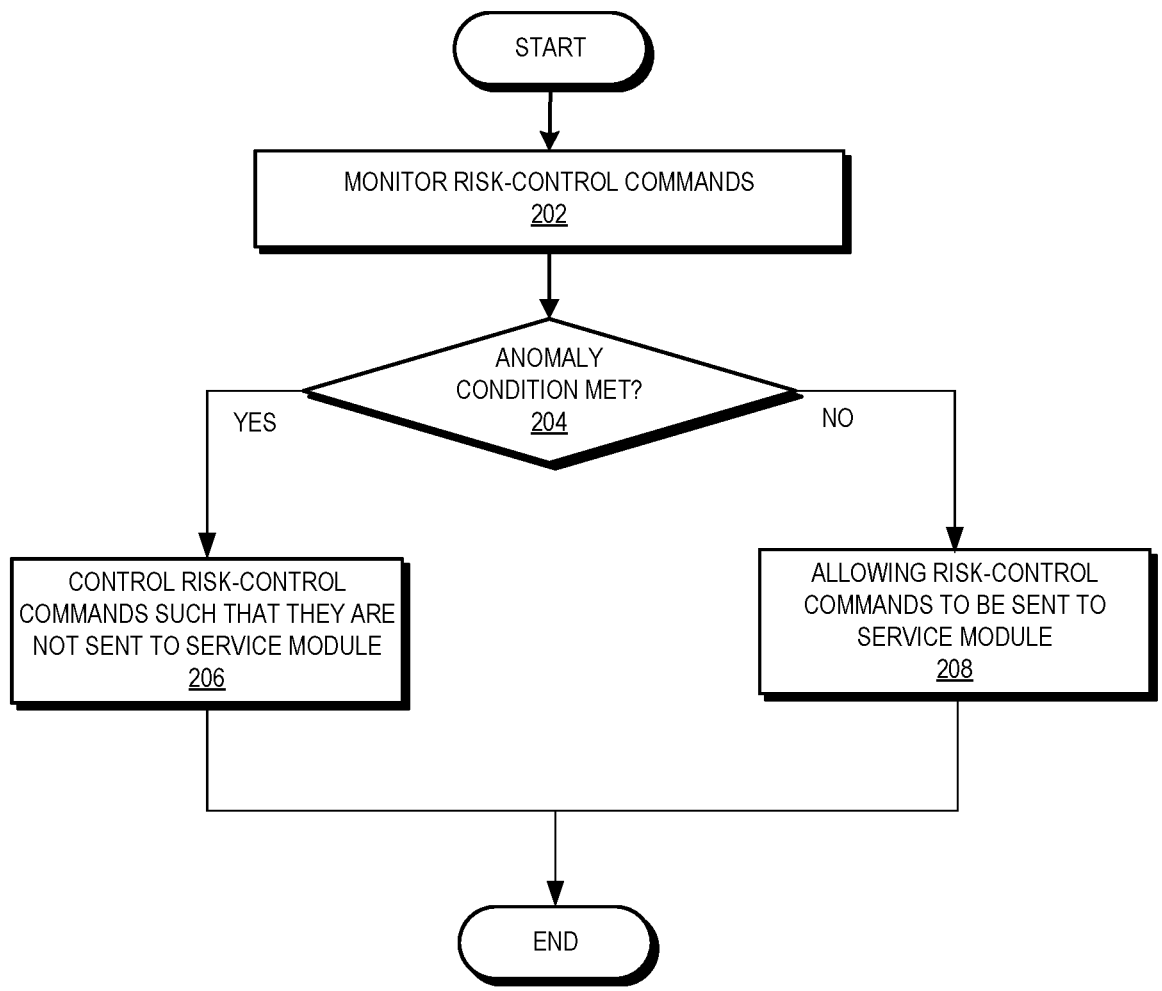
FIG. 2 presents a flowchart illustrating an exemplary process for managing risk-control commands, according to one embodiment.

FIG. 2 presents a flowchart illustrating an exemplary process for managing risk-control commands, according to one embodiment. During operation, the system monitors the risk-control commands issued by the risk-control system to obtain the command statistics (operation 202). The risk-control system is configured to send risk-control commands associated with services provided by a service module. A service module can be an online financial platform and the services can include transactions executed on the online financial platform. While monitoring the risk-control commands, the system can obtain the command statistics associated with a predetermined time interval, such as one minute or ten minutes. In some embodiments, the system can obtain statistics (e.g., the number of issued commands within the predetermined interval) for different subsets of risk-control commands (e.g., for each type of risk-control command) and compares the recently obtained statistics with historic data to determine whether a particular subset (or type) of risk-control commands is abnormal.

Depending on the specified actions, the risk-control system can issue different types of risk-control commands, which are categorized based on the type of penalty actions specified by each risk-control command. Exemplary types of risk-control command can include, but are not limited to: normal-service-execution command, user-authentication-requirement command, payment-reception-limiting command, transaction/service-freezing command, account-freezing command, etc. In one example, for each type of risk-control command, the system compares its number with historical data. If the risk-control system is issuing significantly more or fewer commands of a particular type within the predetermined time interval, the system may determine that the issuance of that particular type of risk-control command is abnormal.

For each type of risk-control command, the system determines whether a predetermined anomaly condition is met (operation 204). In one embodiment, a risk-control command may correspond to a plurality of anomaly conditions. The system can determine that a particular type of risk-control command is anomalous based on one anomaly condition being met or multiple anomaly conditions being met simultaneously.

In some embodiments, for each type of risk-control command, there are at least two anomaly conditions. The first anomaly condition can be met if the system determines that the number of issued risk-control commands of the particular type within the predetermined time interval is greater than a first threshold or less than a second threshold, the first threshold being greater than the second threshold. The first threshold and the second threshold corresponding to a particular type of risk-control command may be determined based on historical data. For example, the system can collect statistics for a number of historical time intervals, referred to as the predetermined time intervals included in a selected historical time period. If the system collects current statistics using a predetermined time interval of one minute, a historical time interval for determining historical statistic can also be one minute. Based on the number of risk-control commands issued within each historical time interval, the system can obtain the probability distribution of the number of risk-control commands of a particular type issued by the risk control system, and determine a confidence interval according to the probability distribution and a predetermined confidence value. The first and second thresholds corresponding to the particular command type can then be determined based on the confidence interval.

A confidence interval refers to a range of errors between a sample average value (i.e., an average value obtained by averaging samples of the numbers of the risk-control commands of the particular type issued by the risk-control system within the historical time intervals included in a selected historical time period) and an ideal average value (i.e., under an ideal condition, the average value obtained by averaging samples of the expected numbers of risk-control commands of the particular command type issued by the risk-control system within the historical time intervals). The confidence level refers to a probability that the ideal average value falls within the confidence interval. A greater confidence interval indicates a higher confidence level. In practice, the confidence level may be set at 95%, and the confidence interval can be obtained based on the probability distribution and the confidence level.

Figure 3:
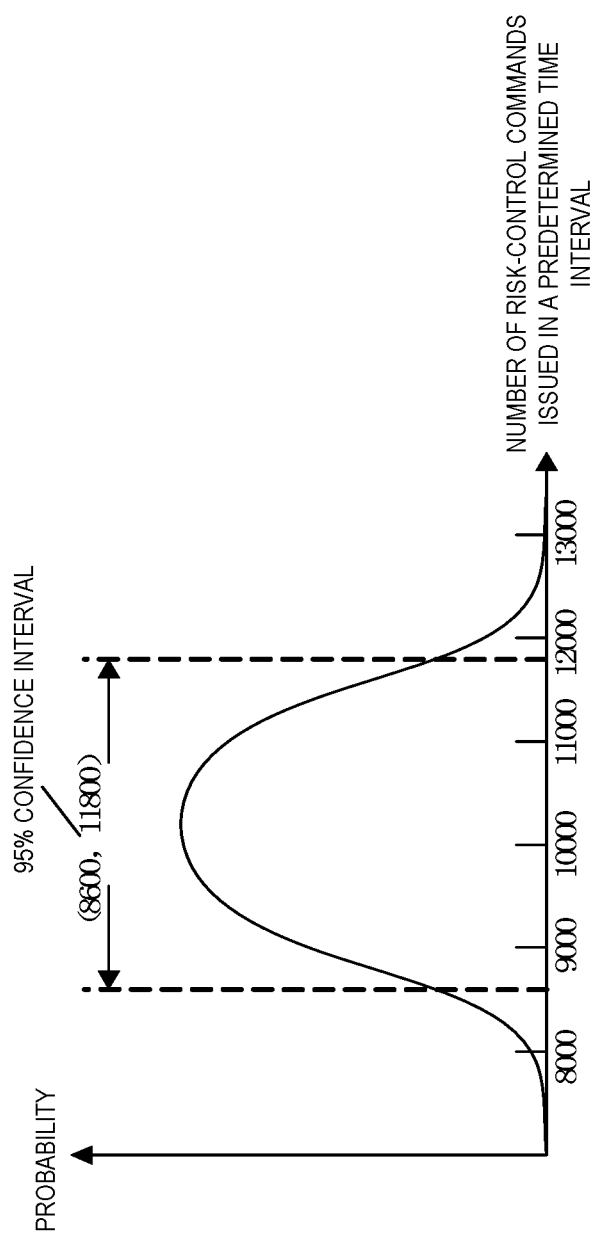
FIG. 3 illustrates an exemplary probability distribution of the number of risk-control commands for a particular command type issued within a predetermined time interval, according to one embodiment.

FIG. 3 illustrates an exemplary probability distribution of the number of risk-control commands for a particular command type issued within a predetermined time interval, according to one embodiment. In this example, the probability distribution of risk-control commands of type A can be determined based on the numbers of type A risk-control commands issued by the risk-control system within a large number of historical time intervals (e.g., one-minute time intervals). More specifically, FIG. 3 shows the confidence interval (i.e., 8600-11800) for a confidence level of 95%, meaning that there is a 95% chance that the number of risk-control commands of type A issued within a predetermined time interval (e.g., one minute) is between 8600 and 11800.

In some embodiments, if the number of risk-control commands of type A issued within a predetermined time interval falls outside of the confidence interval as illustrated in FIG. 3, the system can determine that the risk-control system is malfunctioning, issuing an abnormal number of risk-control commands of type A. In one embodiment, the first and second thresholds corresponding to a particular command type specified by the first anomaly condition can be determined based on the confidence interval and the actual needs of the practical application. For example, given that the first threshold is no less than a corresponding value (e.g., 11800 as illustrated in FIG. 3) at the right end of the quantity confidence interval, the first threshold may be obtained by adding a predetermined value to the right-end value of the confidence interval. Similarly, given that the second threshold is no greater than a corresponding value (e.g., 8600 as illustrated in FIG. 3) at the left end of the confidence interval, the second threshold may be obtained by subtracting a predetermined value from the left-end value of the confidence interval.

The second anomaly condition can be met if the system determines that a ratio between the number of risk-control commands of a particular command type issued by the risk-control system and the number of transactions or services received by the risk-control system within the predetermined time interval is greater than a first predetermined ratio corresponding to the particular command type or less than a second predetermined ratio, the first predetermined ratio being greater than the second predetermined ratio.

Like the first and second thresholds, the first and second predetermined ratios can be determined based on historic data. More specifically, for each historical time interval, the system can determine the number of issued risk-control commands of a particular type and the number of transactions/services received by the risk-control system. The system can then calculate a ratio between these two numbers, obtain the probability distribution of the ratio based on data from a large number of historical time intervals, and determine a ratio confidence interval based on the probability distribution and a predetermined confidence level (e.g., 95%). The first and second predetermined ratios corresponding to a particular command type specified by the second anomaly condition can be determined based on the probability distribution and the predetermined confidence level.

Returning to FIG. 2, if the system determines that an anomaly condition for a particular command type is met, the system can control the risk-control commands of that particular type such that those risk-control commands will not be sent to the service module providing services (operation 206). In an example, the services can be transactions performed on an online financial platform, and the abnormal command type can be "freezing-account." In such a case, risk-control commands instructing the online financial platform to freeze the customers' accounts will not be sent to the online financial platform, thus preventing the malfunctioning risk-control system from interrupting normal services. On the other hand, other types of command, such as the user-authentication commands can still be sent to the service module.

Various mechanisms can be used by the system to control the risk-control commands of a particular type to prevent such commands from being sent to the service module. In one embodiment, the system that manages or controls the risk-control commands may serve as an intermediary device between the service module and the risk-control system and can be configured to forward the risk-control commands from the risk-control system to the service module. In such a scenario, the system can simply stop forwarding the risk-control commands of the particular type from the risk-control system to the service module.

If the system determines that the risk-control commands of a particular type do not meet any anomaly condition, the system can allow the corresponding risk-control commands to be sent from the risk-control system to the service module (operation 208).

As one can see from FIG. 2, the system can monitor and control the risk-control commands in real time such that abnormal risk-control commands can be immediately isolated from the service module to prevent interruptions to normal services provided to users. Such operations do not require any manual intervention. Moreover, by monitoring and collecting statistics for each command type, the system also allows the policy-specific management and control of the risk-control command. For example, a particular risk-control policy can be misconfigured and, when brought up online, may cause the risk-control system to issue a particular type of risk-control policy abnormally (e.g., an abnormally large number of freeze-account commands may be issued due to the misconfigured policy). By timely detecting such an anomaly, the system can timely identify a misconfigured policy to prevent such a policy from interrupting normal services. In some embodiments, once the misconfigured policy is identified, the policy can be taken offline to allow a human administrator to perform necessary repairs (e.g., reconfiguration or redesign) of the policy. After repair or reconfiguration, the risk-control policy can be brought back online. In the meantime, the system continues to monitor risk-control commands associated with the policy (e.g., risk-control commands of a particular type). If the system determines that the risk-control commands of the particular type no longer meet the anomaly condition, the system can stop blocking the risk-control commands to allow the risk-control commands to be delivered to the service module. In other words, once the system determines that the risk-control system is no longer malfunctioning, the system can allow the risk-control system to send its normal risk-control commands to the service module. This allows the automatic recovery of the risk-control operations without receiving explicit commands or instructions from human operators. In other examples, the abnormality of the risk-control system may also be caused by other factors (e.g., software or hardware failures). Once the problem is fixed, the system can determine that the risk-control commands no longer meet the anomaly condition and resume forwarding the risk-control commands to the service module.

In some embodiments, in addition to preventing the forwarding of malfunctioning risk-control commands to the service module, the system may determine, based on a predetermined substitution rule, a different type of risk-control command to replace the particular type of command that is abnormal. The system can then send the different type of risk-control command to the service module. More specifically, the penalty level specified by the different type of risk-control command can be different from that of the particular type of command that is abnormal. In one example, the penalty level of the different type of risk-control command can be lower than the abnormal type of command. In a different example, the penalty level of the different type of risk-control command can be higher than that of the abnormal one.

More specifically, if a particular command type corresponds to a detected risk (i.e., additional risk-control measure is needed), and the system determines that the number of risk-control commands issued for this particular type satisfies an anomaly condition, the system may manage the risk-control commands by substituting the risk-control commands of this particular type with risk-control commands of a different type. In other words, instead of the risk-control commands generated by the risk-control system, the system sends the substitute commands to the service module. The substitute risk-control commands can have a lower penalty level. For example, if the abnormal risk-control commands specify a penalty action of freezing accounts, the substitute commands may specify a penalty action of requiring user authentication.

If a particular command type corresponds to a no risk scenario (i.e., no risk-control measure is needed), and the system determines that the number of risk-control commands issued for this particular type satisfies an anomaly condition, the system may manage the risk-control commands by substituting risk-control commands of this particular type with risk-control commands of a different type and sending the substitute commands to the service module. The substitute risk-control commands can have a higher penalty level. For example, if the abnormal commands specify no penalty action, the substitute commands may specify a penalty action of requiring user authentication.

The approach of sending substitute commands can provide additional benefits more than simply stopping the delivery of the abnormal risk-control commands. In practice, the abnormal number of risk-control commands of a particular type does not always indicate that each of the risk-control commands of this particular type is wrongfully issued. The one-size-fits-all solution of simple blockage of all risk-control commands may cause the service system to mistake certain risky services or transactions as having no risks. This may lead to potential losses to the users. To mitigate this potential risk, in addition to isolating the abnormal type of risk-control commands from the service module (e.g., not sending the risk-control commands), the system may send substitute risk-control commands with higher or lower penalty levels to the service module. This can prevent the service module from mistaking some services having low risks as services having no risks.

For example, in an electronic payment application, the risk-control system may generally issue risk-control commands for freezing accounts to the service module with respect to certain fund-transfer transactions or services having fraud risks. When the system determines that the risk-control commands of the freezing-account type meet the anomaly condition, the system can control the risk-control commands for freezing accounts such that they are not sent to the service module. In addition, the system can send risk-control commands having a lower penalty level than the freezing-account type of command, such as the user-authentication type of risk-control command, to the service module, to instruct the service module to authenticate the users requesting the fund-transfer transactions before performing the fund-transfer transactions.

In some embodiments, the risk-control system can include a number of sets of risk-control policies, with each set of policies being designed to identify risks associated with a particular type of service. For example, the risk-control system of an online financial platform can include multiple sets of risk-control policies, with one set for identifying risk associated with fund transfers, one set for deposits, one set for withdrawals, etc. During operation, the system can obtain statistics for each set of policies, such as counting, within a predetermined time interval, the number of risk-control commands of a particular type issued by the risk-control system based on a particular set of risk-control policies. The system also maintains anomaly conditions specific to each set of policies. Such anomaly conditions can be obtained based on historical data associated with each set of policies, such as the probability distribution similar to what is shown in FIG. 3. More specifically, the system can count the number of a particular type of commands associated with a particular set of policies for each historical time interval within a historical time period, and obtain the probability distribution of the particular type of commands associated with the particular set of policies. Based on the probability distribution and a predetermined confidence interval (e.g., 95% or depending on the need of the practical application), the system can determine an upper threshold and a lower threshold. A first anomaly condition is met if the number of the particular type of command associated with the particular set of policies within the predetermined time interval exceeds the upper threshold or is below the lower threshold. Similarly, the system can also determine a ratio or percentage of a particular type of command associated with a particular set of policies against all commands issued within each historical time interval. The system can then compute the probability distribution of the ratio or percentage, and determine an upper ratio threshold and a lower ratio threshold based on the probability distribution of the ratio and the predetermined confidence interval. A second anomaly condition is met if the ratio of the particular type of command associated with the particular set of policies within the predetermined time interval exceeds the upper ratio threshold or is below the lower ratio threshold.

By determining whether the risk-control commands associated with a particular set of policies meet an anomaly condition, the system can determine whether to control the associated risk-control commands such that these commands will not be sent to the service module. This approach allows the system to be able to identify a set of malfunctioning risk-control policies and isolate such policies from the service module, without affecting other sets of policies. This can be important in situations where the abnormality associated with a particular type of risk-control command is only caused by a single set of policies, not all policies.

In alternative embodiments, each set of risk-control policies can include multiple risk-control policies. For example, a set of policies for identifying risk associated with fund transfers can include a policy for dealing with fraud risk, a policy for dealing with money-laundering risk, a policy for dealing with identity theft risk, etc. During operation, the system can obtain statistics for each individual policy, such as counting, within a predetermined time interval, the number of risk-control commands of a particular type issued by the risk-control system based on a particular risk-control policy. The system also maintains anomaly conditions specific to each individual policy. Such anomaly conditions can be obtained based on historical data associated with each set of policies, such as the probability distribution similar to what is shown in FIG. 3. Like the aforementioned examples, the anomaly conditions for the policy-specific risk-control commands can include a first anomaly condition based on the number of the policy-specific commands and a second anomaly condition based on the ratio of the policy-specific commands. Regardless of which anomaly condition is used, the system is able to identify a single malfunctioning risk-control policy among multiple policies within the same set, thus allowing the system to isolate such a policy from the service module, without affecting other policies within the same set. This can be important in situations where the abnormality associated with a particular type of risk-control command is only caused by a single policy, not an entire set of policies.

In general, when monitoring and collecting statistics associated with the risk-control commands, the system can apply three different levels of granularity. The first level of granularity is to count all risk-control commands of a particular type within a time interval, regardless of the policy set or policy, based on which the risk-control commands are generated. The second level of granularity is to count the risk-control commands of a particular type that are issued based on a particular set of policies within the time interval. The third level of granularity is to count the risk-control commands of a particular type that are issued based on a particular policy within the time interval. Depending on the need, one can configure the system to operate under one or more of the three levels of granularities. More specifically, the system can obtain statistics of all three granularities, or one or two granularities. When determining whether the risk-control system is malfunctioning, the system can detect anomalous risk-control commands under any one of the three granularities. Based on the anomaly detection result, the system can choose to isolate all commands of a particular type, commands of a particular type associated with a set of policies, or commands of a particular type associated with a single policy.

Figure 4:
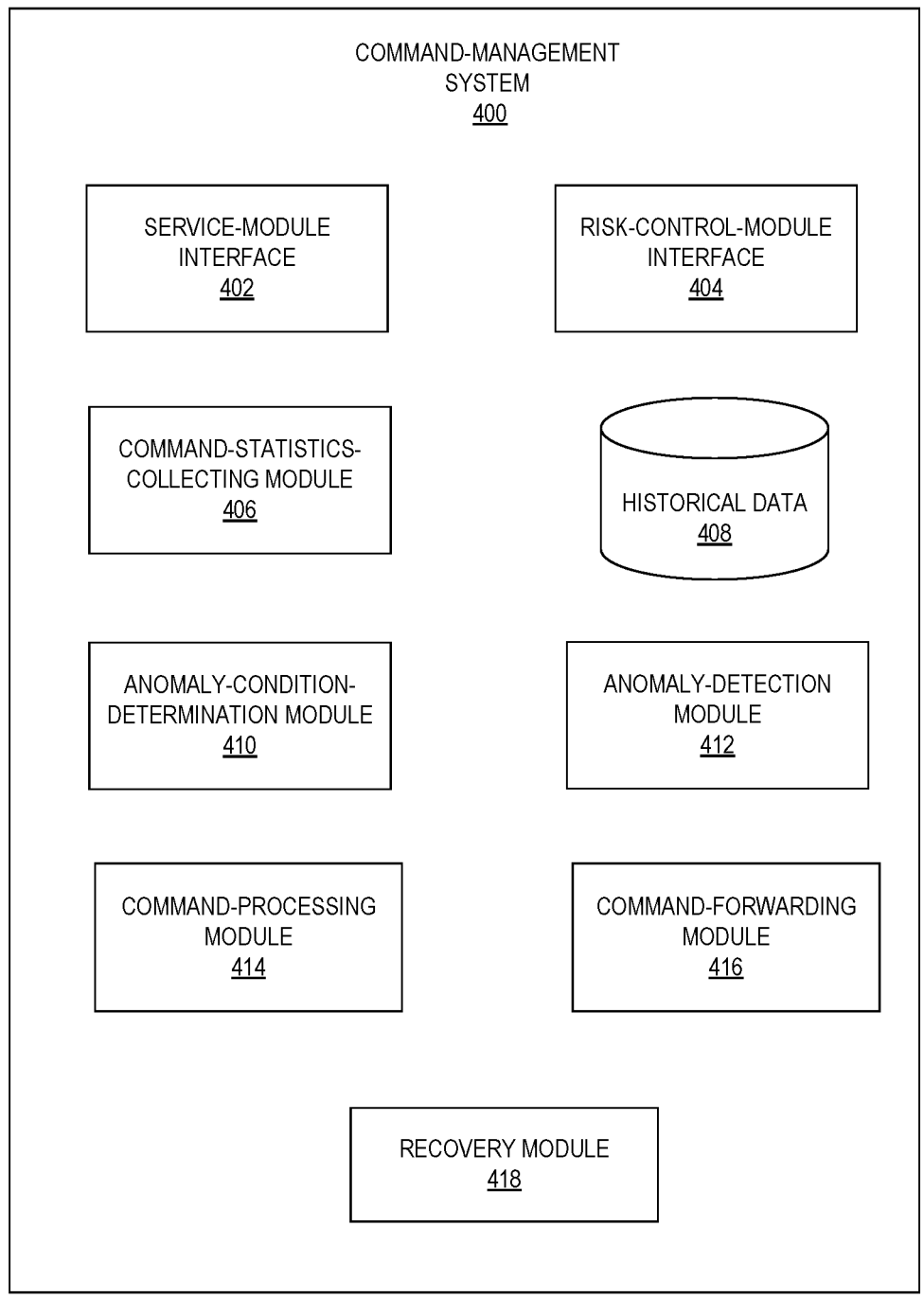
FIG. 4 illustrates an exemplary command-management system, according to one embodiment.

FIG. 4 illustrates an exemplary command-management system, according to one embodiment. Command-management system 400 can include a plurality of units or module which may communicate with one another via a wired, wireless, quantum light, or electrical communication channel. Command-management system 400 may be realized using one or more integrated circuits, and may include fewer or more units or modules than those shown in FIG. 4. Furthermore, command-management system 400 may be integrated in a computer system, or realized as a separate device or devices capable of communicating with other computer systems and/or devices.

Command-management system 400 can include a service-module interface 402 and a risk-control-module interface 404. Service-module interface 402 allows command-management system 400 to communicate with a service module that is configured to provide various types of services (e.g., Internet finance services) to customers. Risk-control-module interface 404 allows command-management system 400 to communicate with a risk-control module that is configured to evaluate risks and issue risk-control commands for services or transactions being performed by the service module.

Command-management system 400 can include a command-statistics-collecting module 406 configured to collect statistics of risk-control commands issued by the risk-control module. In one embodiment, command-statistics-collecting module 406 can receive the risk-control commands via risk-control-module interface 404 and collect statistics associated with the received risk-control commands. The command statistics can be collected under different granularities. In some embodiments, command-statistics-collecting module 406 can determine a number or a ratio of commands of a particular type received within a predetermined time interval (e.g., one minute or ten minutes). Alternatively, command-statistics-collecting module 406 can determine a number or a ratio of commands of a particular type associated with a particular set of risk-control policies received within a predetermine time interval, or determine a number or a ratio of commands of a particular type associated with a particular risk-control policy received within a predetermined time interval.

Command-management system 400 can include a historical data depository 408, which is configured to store historical data associated with the risk-control commands. For example, after the current usage, the command statistics collected by command-statistics-collecting module 406 can be time stamped and stored into historical data depository 408. In some embodiments, historical data depository 408 can be configured to store historical data within a predetermined time period (e.g., an hour, a day, a month, etc.). In a further embodiment, historical data depository 408 can be configured to store most recent historical data (e.g., data obtained for the last hour, day, or month). In such a case, old data will be deleted as new data is added.

Command-management system 400 can include anomaly-condition-determination module 410 configured to determine a number of anomaly conditions based on historical data stored in historical data depository 408. Depending on the need of the practical application and the mode of operation, anomaly-condition-determination module 410 can determine a number of anomaly conditions, including first and second anomaly conditions for each type of risk-control command, first and second anomaly conditions for each type of risk-control command associated with each set of risk-control policies, and first and second anomaly conditions for each type of risk-control command associated with each risk-control policy. In one embodiment, a respective anomaly condition can specify a monitored quantity, a time interval, a higher threshold value, and a lower threshold value. The monitored quantity can be the number of a particular type of risk-control command or a ratio of the particular risk-control command. The time interval can be the duration of the window of monitoring. The anomaly condition can be met if the monitored quantity is greater than the higher threshold value or less than the lower threshold value.

Command-management system 400 can include anomaly-detection module 412 configured to detect anomalous risk-control commands. Depending on the need of the practical application, anomaly-detection module 412 can determine whether risk-control commands of a particular type, risk-control commands of a particular type associated with a particular set of risk-control policies, or risk-control commands of a particular type associated with a particular risk-control policy are anomalous based on corresponding command statistics and anomaly conditions.

Command-management system 400 can further include command-processing module 414 and command-forwarding module 416. Command-processing module 414 is configured to process the risk-control commands based on the anomaly-detection outcome generated by anomaly-detection module 412. Command-forwarding module 416 is configured to forward risk-control commands that have been processed by command-processing module 414 to the service system to allow the service system to process the corresponding transactions according to the risk-control commands. For example, if anomaly-detection module 412 determines that a particular type of risk-control command (or a particular type of risk-control command associated with a particular set of policies or a particular policy) is anomalous, command-processing module 414 can process the particular type of risk-control command such that these anomalous risk-control commands will not be forwarded by command-forwarding module 416. Moreover, command-processing module 414 can substitute the anomalous risk-control commands using lower- or higher-level risk-control commands (i.e., risk-control commands carrying a lower or higher level of penalty) and command-forwarding module 416 can forward the lower- or higher-level risk-control commands to the service system. For example, if anomaly-detection module 412 determines that a particular type of risk-control command (or a particular type of risk-control command associated with a particular set of policies or a particular policy) is normal, command-processing module 414 can skip the processing of these normal commands to allow command-forwarding module 416 to directly forward these normal commands to the service system.

Command-management system 400 can also include a recovery module 418 configured to facilitate the recovery of the risk-control commands from an anomalous state. More specifically, in response to anomaly-detection module 412 determining that a particular type of anomalous command no longer satisfies the anomaly condition, recovery module 418 can interact with command-processing module 414 and command-forwarding module 416. More specifically, recovery module 418 can notify processing module 414 to stop processing these previously anomalous but currently normal commands, and notify command-forwarding module 416 to directly forward these previously anomalous but currently normal commands to the service system.

Figure 5:
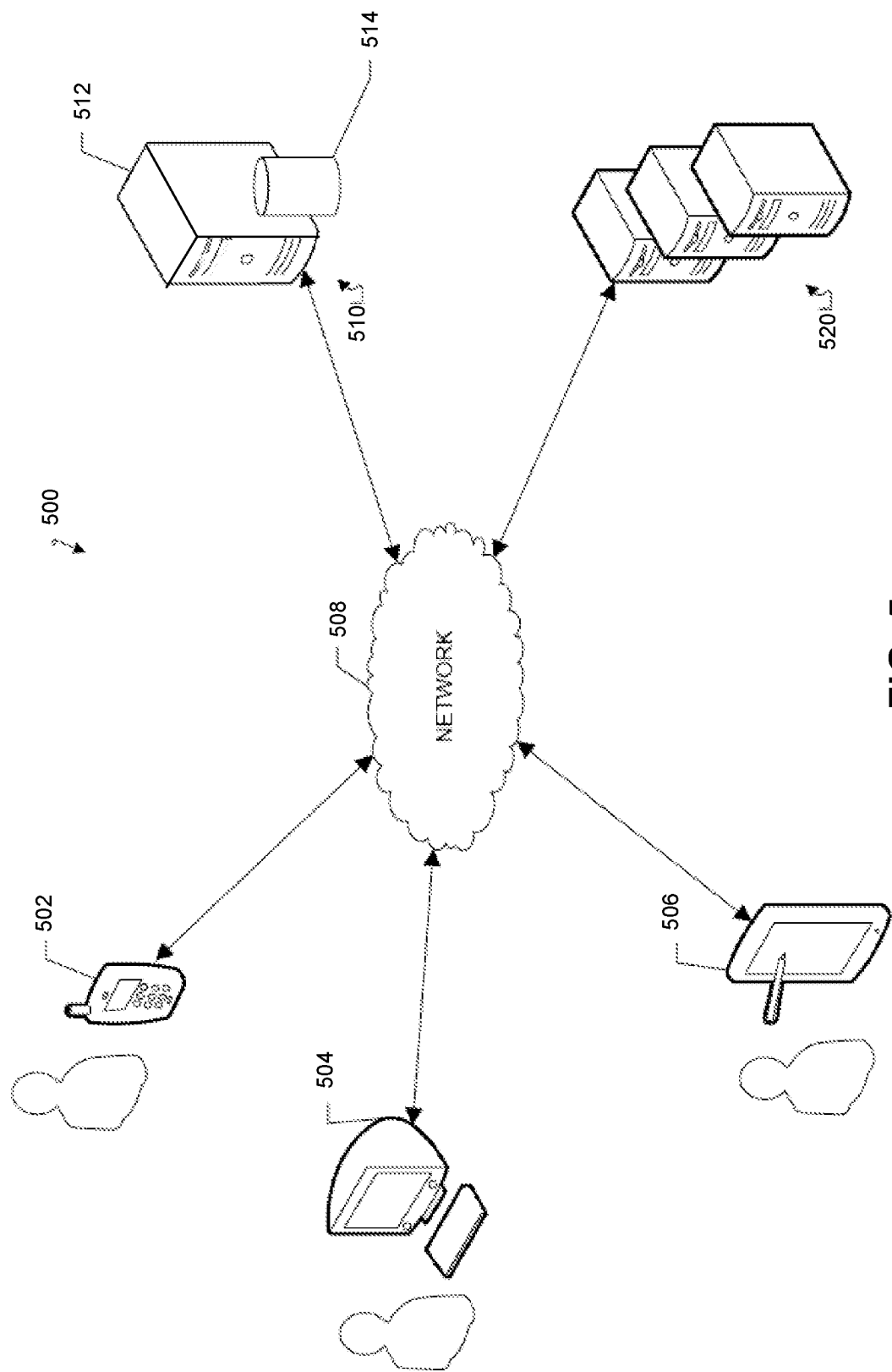
FIG. 5 illustrates an exemplary client-server network environment for implementing the disclosed command-management technology, in accordance with some embodiments described herein.

FIG. 5 illustrates an exemplary client-server network environment for implementing the disclosed command-management technology, in accordance with some embodiments described herein. A network environment 500 includes a number of electronic devices 502, 504 and 506 communicably connected to a server 510 by a network 508. One or more remote servers 520 are further coupled to the server 510 and/or the one or more electronic devices 502, 504 and 506.

In some exemplary embodiments, electronic devices 502, 504 and 506 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, electronic devices 502, 504 and 506 store a user agent such as a browser or application. In the example of FIG. 5, electronic device 502 is depicted as a smartphone, electronic device 504 is depicted as a desktop computer, and electronic device 506 is depicted as a PDA.

Server 510 includes a processing device 512 and a data store 514. Processing device 512 executes computer instructions stored in data store 514, for example, to assist in scheduling a customer-initiated service or a service-provider-initiated service between a service provider and a customer at electronic devices 502, 504 and 506 during a service scheduling process.

In some exemplary aspects, server 510 can be a single computing device such as a computer server. In other embodiments, server 510 can represent more than one computing device working together to perform the actions of a server computer (e.g., cloud computing). Server 510 may host the web server communicably coupled to the browser at the client device (e.g., electronic devices 502, 504 or 506) via network 508. In one example, server 510 may host a client application for scheduling a customer-initiated service or a service-provider-initiated service between a service provider and a customer during a service scheduling process. Server 510 may further be in communication with one or more remote servers 520 either through network 508 or through another network or communication means.

The one or more remote servers 520 may perform various functionalities and/or storage capabilities described herein with regard to server 510, either alone or in combination with server 510. Each of the one or more remote servers 520 may host various services. For example, servers 520 may host services providing risk-control functionalities to financial services provided by server 510.

Each of the one or more remote servers 520 can be a single computing device, such as a computer server, or can represent more than one computing device working together to perform the actions of a server computer (e.g., cloud computing). In one embodiment server 510 and one or more remote servers 520 may be implemented as a single server or a cluster of servers. In one example, server 510 and one or more remote servers 520 may communicate through the user agent at the client device (e.g., electronic devices 502, 504 or 506) via network 508.

Users may interact with the system hosted by server 510, and/or one or more services hosted by remote servers 520, through a client application installed at the electronic devices 502, 504, and 506. Alternatively, the user may interact with the system and the financial services through a web-based browser application at the electronic devices 502, 504, 506. Communication among client devices 502, 504, 506 and the system, and/or one or more services, may be facilitated through a network (e.g., network 508).

Communications among the client devices 502, 504, 506, server 510 and/or one or more remote servers 520 may be facilitated through various communication protocols. In some aspects, client devices 502, 504, 506, server 510 and/or one or more remote servers 520 may communicate wirelessly through a communication interface (not shown), which may include digital signal processing circuitry where necessary. The communication interface may provide for communications under various modes or protocols, including Global System for Mobile Communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enabled device, Wi-Fi, or other such transceiver.

Network 508 can include, for example, any one or more of a personal area network (PAN), a local area network (LAN), a campus area network (CAN), a metropolitan area network (MAN), a wide area network (WAN), a broadband network (BBN), the Internet, and the like. Further, network 508 can include, but is not limited to, any one or more of the following network topologies, including a bus network, a star network, a ring network, a mesh network, a star-bus network, a tree or hierarchical network, and the like.

Figure 6:
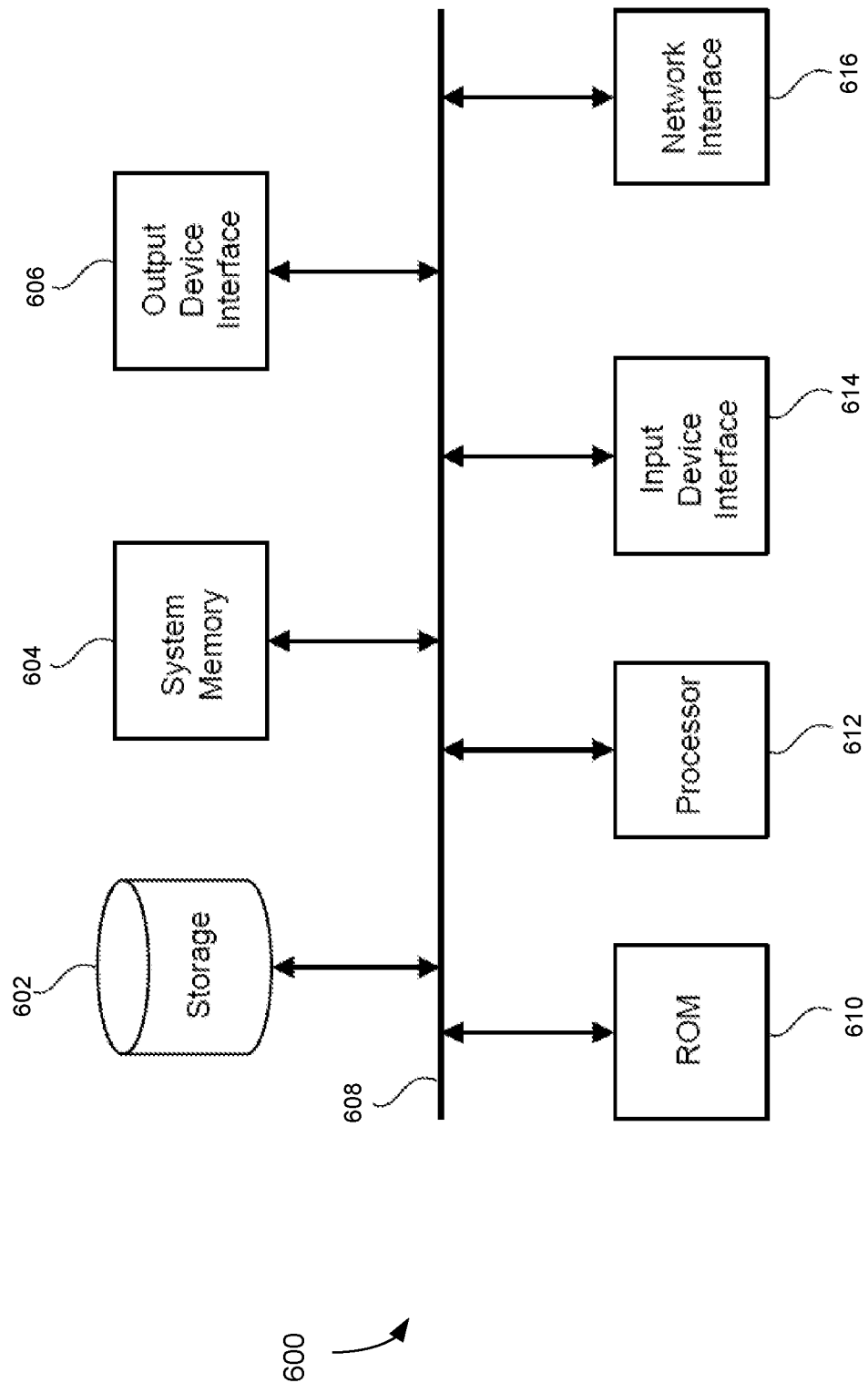
FIG. 6 conceptually illustrates an electronic system with which some disclosed embodiments are implemented.

FIG. 6 conceptually illustrates an electronic system with which some implementations of the subject technology are implemented. Electronic system 600 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of electronic system 600. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations. For example, the various memory units can store an operating system and a command-management system. The command-management system can include instructions, which when executed by processing unit(s) 612, can cause processing unit(s) 612 to perform methods and/or processes described in this disclosure. Moreover, the command-management system can include various modules, similar to the modules shown in FIG. 4, with each module including instructions for performing a specific task (e.g., collecting statistics associated with risk-control commands, determining anomaly conditions for risk-control commands based on historical data, determining whether a particular subset of risk-control commands meets an anomaly condition, processing anomalous risk-control commands, forwarding risk-control commands, etc.).

Bus 608 also connects to input and output device interfaces 614 and 606, respectively. Input device interface 614 enables the user to communicate information to and select commands for the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as cathode ray tubes (CRT) or liquid crystal displays (LCD). Some implementations include devices such as a touchscreen that functions as both an input and an output device.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method, comprising:
monitoring, by a computer, types and numbers of risk-control commands issued by a risk-control system, wherein the risk-control commands correspond to transactions associated with users which receive service from an online financial platform;
obtaining statistics associated with the monitored risk-control commands;
determining, based on the obtained statistics, whether a subset of risk-control commands meets an anomaly condition, wherein the subset comprises at least one of: a particular type of risk-control command; and a particular type of risk-control command associated with a particular set of a plurality of sets of risk-control policies,
wherein the plurality of sets of risk-control policies identify risks associated with a particular type of transaction,
wherein the plurality of sets include at least one of: a first set for identifying risks associated with fund transfers; a second set for identifying risks associated with deposits; and a third set for identifying risks associated with withdrawals,
wherein the first set further includes at least one of: a first policy for dealing with fraud risk; a second policy for dealing with money-laundering risk; and a third policy for dealing with identity theft risk, and
wherein the anomaly condition is based on the obtained statistics and a ratio between a number of risk-control commands within the subset and a total number of risk-control commands issued by the risk-control system over a predetermined time interval, wherein the anomaly condition specifies a higher threshold and a lower threshold, and wherein the subset of risk-control commands meets the anomaly condition if the number or the ratio is greater than the higher threshold or less than the lower threshold;
in response to determining that the subset of risk-control commands does not meet the anomaly condition, forwarding the subset of risk-control commands to the online financial platform to facilitate the online financial platform in performing corresponding transactions according to the subset of risk-control commands;
in response to determining that the subset of risk-control commands meets the anomaly condition, preventing the subset of risk-control commands from being forwarded to the online financial platform;
subsequent to preventing the subset of risk-control commands from being forwarded to the online financial platform, continuing to monitor the subset of risk-control commands to determine whether the subset of risk-control commands no longer meets the anomaly condition; and in response to determining that the subset of risk-control commands no longer meets the anomaly condition, forwarding the subset of risk-control commands to the online financial platform.

2. The method of claim 1,
wherein the particular type of risk-control command is configured to instruct the online financial platform to perform a particular action associated with a corresponding transaction;
wherein the particular set of risk-control policies is associated with a particular type of transaction; and
wherein the subset of risk-control commands further comprises a particular type of risk-control command associated with a particular risk-control policy, wherein the particular risk-control policy is associated with a particular type of risk.

3. The method of claim 1, wherein the statistics associated with the monitored plurality of risk-control commands comprises one or more of:
the number of risk-control commands within the subset issued by the risk-control system over the predetermined time interval; and
the ratio between the number of risk-control commands within the subset and the total number of risk-control commands issued by the risk-control system over the predetermined time interval.

4. The method of claim 3, wherein the anomaly condition is determined based on historical data associated with the subset of risk-control commands.

5. The method of claim 4, wherein the anomaly condition is determined based on probability distribution of the number or the ratio and a predetermined confidence interval.

6. The method of claim 1, wherein preventing the subset of risk-control commands from being forwarded to the online financial platform further comprises:
substituting the subset of risk-control commands using a second subset of risk-control commands, wherein the subset and second subset of risk-control commands are of different types; and
forwarding the second subset of risk-control commands to the online financial platform to facilitate the online financial platform in performing corresponding transactions according to the second subset of risk-control commands.

7. A computer system, comprising:
a processor; and
a storage device coupled to the processor and storing instructions which when executed by the processor cause the processor to perform a method, the method comprising:
monitoring, by a computer, types and numbers of risk-control commands issued by a risk-control system, wherein the risk-control commands correspond to transactions associated with users which receive service from an online financial platform;
obtaining statistics associated with the monitored risk-control commands;
determining, based on the obtained statistics, whether a subset of risk-control commands meets an anomaly condition, wherein the subset comprises at least one of: a particular type of risk-control command; and a particular type of risk-control command associated with a particular set of a plurality of sets of risk-control policies,
wherein the plurality of sets of risk-control policies identify risks associated with a particular type of transaction,
wherein the plurality of sets include at least one of: a first set for identifying risks associated with fund transfers; a second set for identifying risks associated with deposits; and a third set for identifying risks associated with withdrawals,
wherein the first set further includes at least one of: a first policy for dealing with fraud risk; a second policy for dealing with money-laundering risk; and a third policy for dealing with identity theft risk, and
wherein the anomaly condition is based on the obtained statistics and a ratio between a number of risk-control commands within the subset and a total number of risk-control commands issued by the risk-control system over a predetermined time interval, wherein the anomaly condition specifies a higher threshold and a lower threshold, and wherein the subset of risk-control commands meets the anomaly condition if the number or the ratio is greater than the higher threshold or less than the lower threshold;
in response to determining that the subset of risk-control commands does not meet the anomaly condition, forwarding the subset of risk-control commands to the online financial platform to facilitate the online financial platform in performing corresponding transactions according to the subset of risk-control commands;
in response to determining that the subset of risk-control commands meets the anomaly condition, preventing the subset of risk-control commands from being forwarded to the online financial platform;
subsequent to preventing the subset of risk-control commands from being forwarded to the online financial platform, continuing to monitor the subset of risk-control commands to determine whether the subset of risk-control commands no longer meets the anomaly condition; and
in response to determining that the subset of risk-control commands no longer meets the anomaly condition, forwarding the subset of risk-control commands to the online financial platform.

8. The computer system of claim 7,
wherein the particular type of risk-control command is configured to instruct the online financial platform to perform a particular action associated with a corresponding transaction;
wherein the particular set of risk-control policies is associated with a particular type of transaction; and
wherein the subset of risk-control commands further comprises a particular type of risk-control command associated with a particular risk-control policy, wherein the particular risk-control policy is associated with a particular type of risk.

9. The computer system of claim 7, wherein the statistics associated with the monitored plurality of risk-control commands comprises one or more of:
the number of risk-control commands within the subset issued by the risk-control system over the predetermined time interval; and
the ratio between the number of risk-control commands within the subset and a total number of risk-control commands issued by the risk-control system over the predetermined time interval.

10. The computer system of claim 9, wherein the anomaly condition is determined based on historical data associated with the subset of risk-control commands.

11. The computer system of claim 10, wherein the anomaly condition is determined based on probability distribution of the number or the ratio and a predetermined confidence interval.

12. The computer system of claim 7, wherein preventing the subset of risk-control commands from being forwarded to the online financial platform further comprises:
   substituting the subset of risk-control commands using a second subset of risk-control commands, wherein the subset and second subset of risk-control commands are of different types; and
   forwarding the second subset of risk-control commands to the online financial platform to facilitate the online financial platform in performing corresponding transactions according to the second subset of risk-control commands.

13. A non-transitory computer-readable storage medium storing instructions that when executed by a computer cause the computer to perform a method, the method comprising:
   monitoring, by a computer, types and numbers of risk-control commands issued by a risk-control system, wherein the risk-control commands correspond to transactions associated with users which receive service from an online financial platform;
   obtaining statistics associated with the monitored risk-control commands;
   determining, based on the obtained statistics, whether a subset of risk-control commands meets an anomaly condition, wherein the subset comprises at least one of: a particular type of risk-control command; and a particular type of risk-control command associated with a particular set of a plurality of sets of risk-control policies,
   wherein the plurality of sets of risk-control policies identify risks associated with a particular type of transaction,
   wherein the plurality of sets include at least one of: a first set for identifying risks associated with fund transfers; a second set for identifying risks associated with deposits; and a third set for identifying risks associated with withdrawals,
   wherein the first set further includes at least one of: a first policy for dealing with fraud risk; a second policy for dealing with money-laundering risk; and a third policy for dealing with identity theft risk, and
   wherein the anomaly condition is based on the obtained statistics and a ratio between a number of risk-control commands within the subset and a total number of risk-control commands issued by the risk-control system over a predetermined time interval, wherein the anomaly condition specifies a higher threshold and a lower threshold, and wherein the subset of risk-control commands meets the anomaly condition if the number or the ratio is greater than the higher threshold or less than the lower threshold;
   in response to determining that the subset of risk-control commands does not meet the anomaly condition, forwarding the subset of risk-control commands to the online financial platform to facilitate the online financial platform in performing corresponding transactions according to the subset of risk-control commands;
   in response to determining that the subset of risk-control commands meets the anomaly condition, preventing the subset of risk-control commands from being forwarded to the online financial platform;
   subsequent to preventing the subset of risk-control commands from being forwarded to the online financial platform, continuing to monitor the subset of risk-control commands to determine whether the subset of risk-control commands no longer meets the anomaly condition; and
   in response to determining that the subset of risk-control commands no longer meets the anomaly condition, forwarding the subset of risk-control commands to the online financial platform.

14. The computer-readable storage medium of claim 13, wherein the particular type of risk-control command is configured to instruct the online financial platform to perform a particular action associated with a corresponding transaction;
   wherein the particular set of risk-control policies is associated with a particular type of transaction; and
   wherein the subset of risk-control commands further comprises a particular type of risk-control command associated with a particular risk-control policy, wherein the particular risk-control policy is associated with a particular type of risk.

15. The computer-readable storage medium of claim 13, wherein the statistics associated with the monitored plurality of risk-control commands comprises one or more of:
   the number of risk-control commands within the subset issued by the risk-control system over the predetermined time interval; and
   the ratio between the number of risk-control commands within the subset and the total number of risk-control commands issued by the risk-control system over the predetermined time interval.

16. The computer-readable storage medium of claim 13, wherein preventing the subset of risk-control commands from being forwarded to the online financial platform further comprises:
   substituting the subset of risk-control commands using a second subset of risk-control commands, wherein the subset and second subset of risk-control commands are of different types; and
   forwarding the second subset of risk-control commands to the online financial platform to facilitate the online financial platform in performing corresponding transactions according to the second subset of risk-control command.

* * * * *